(12) United States Patent
Hsu et al.

(10) Patent No.: US 7,517,915 B2
(45) Date of Patent: Apr. 14, 2009

(54) METHOD FOR PROCESSING CERAMIC POWDER SUSPENSION

(75) Inventors: Kung-Chung Hsu, Taipei (TW); Lung-Pin Chen, Taipei (TW); Dao-Shinn Hwung, Beitou Taipei (TW); Kuo-Liang Ying, Taipei (TW); Wen-Cheng Wei, Taipei (TW); Sea-Fue Wang, Taipei (TW)

(73) Assignee: National Taiwan Normal University, Taipei (TW)

( * ) Notice: Subject to any disclaimer, the term of this patent is extended or adjusted under 35 U.S.C. 154(b) by 192 days.

(21) Appl. No.: 11/543,513

(22) Filed: Oct. 5, 2006

(65) Prior Publication Data

US 2007/0032559 A1 Feb. 8, 2007

Related U.S. Application Data

(62) Division of application No. 10/739,636, filed on Dec. 17, 2003, now abandoned.

(30) Foreign Application Priority Data

Feb. 25, 2003 (TW) .............................. 92103874 A

(51) Int. Cl.
*B01F 3/12* (2006.01)
*B01F 17/18* (2006.01)

(52) U.S. Cl. ............................. 516/90; 516/78; 516/88; 516/203; 516/928

(58) Field of Classification Search .................. 516/78, 516/88, 90, 928
See application file for complete search history.

(56) References Cited

U.S. PATENT DOCUMENTS

| | | | | | |
|---|---|---|---|---|---|
| 4,874,826 | A | * | 10/1989 | Sakamoto et al. | 525/534 |
| 5,476,622 | A | * | 12/1995 | Moorhead et al. | 264/639 |
| 5,512,644 | A | * | 4/1996 | Ogura et al. | 526/258 |
| 5,726,267 | A | * | 3/1998 | Howland et al. | 526/304 |
| 6,123,912 | A | * | 9/2000 | Wei et al. | 423/625 |
| 2003/0199653 | A1 | * | 10/2003 | McCormick et al. | 526/219.6 |

* cited by examiner

*Primary Examiner*—Timothy J Kugel
(74) *Attorney, Agent, or Firm*—The Weintraub Group, PLC

(57) ABSTRACT

A method for preparing a ceramic powder suspension is disclosed. A dispersant having a following structural formula is provided:

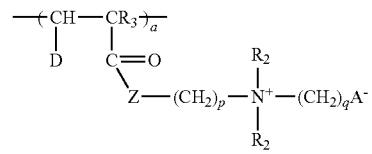

wherein D is H or $COOR_1$; $R_1$ is a hydrogen atom, or an alkyl group, a cyclic aliphatic group, an aryl group, having 1 to 10 carbon atoms, or a cationic salt group; $R_2$ is an alkyl group having 1 to 10 carbon atoms, a cyclic aliphatic having 1 to 10 carbon atoms or an aryl group having 1 to 10 carbon atoms; $R_3$ is a hydrogen atom or a methyl group; Z is an oxygen atom or an NH group; A is $-COO-SO_3$ or an acid form; a is an integer between 1 to 5000; and p and q are integers between 1 to 10. The dispersant is dissolved in a solvent. Ceramic powder is further added into the solvent with the dispersant.

4 Claims, 12 Drawing Sheets

METHOD FOR PROCESSING CERAMIC POWDER SUSPENSION

CROSS-REFERENCE TO RELATED APPLICATION

This application is a divisional of application(s) non-provisional U.S. application Ser. No. 10/739,636 filed on Dec. 17, 2003 now abandoned which claimed priority from Taiwan Republic of China Patent Application No. 092103874 filed on Feb. 25, 2003.

BACKGROUND OF THE INVENTION

1. Field of Invention

The present invention relates to a method for preparing a suspension. More particularly, the present invention relates to a method for processing a ceramic powder suspension.

2. Description of Related Art

Fine ceramics refer to ceramic materials that use highly refined powder ingredients and are precisely processed to provide the particular microstructure and exceptional functions. Functionally, these materials are more thermal resistant, more durable, etch-resisted than the conventional ceramic materials. Further, they also comprise optical, electrical and magnetic properties. The fine ceramics are thus widely used and is becoming a significant industrial material in the fixture.

As the particle size of ceramic powder reduces from a micrometer level to a sub-micron level or even to a nanometer level, particle agglomeration in a suspension becomes a serious issue. An effective dispersing agent thereby plays an important role in the processing of ceramic powder. For a barium titanate water based slurry, the current industry often uses Darvan C (PMAAN) as a dispersing agent. The chemical name of Darvan C (PMAAN) is ammonium polymethacrylate, which can provide a certain degree of dispersing effect. However, there is still room for improvement. When PMAAN is used as a dispersing agent for a barium titanate slurry, barium titanate in water reacts with hydrogen ions to dissociate barium ions, and the physicochemical property at the surface of barium titanate becomes similar to that of titanium dioxide. The dissociated barium ions are re-absorbed onto the surface of the powder. The ratio of barium to titanium of the powder not only changes, the thickness of a Ba-depleted, $TiO_2$-rich surface layer of the powder also becomes greater due to the dissolution of the barium ions. The surface structure is thereby less dense and an abnormal grain growth is resulted during sintering. The quality of the product is adversely affected.

SUMMARY OF THE INVENTION

Accordingly, the present invention provides a method for processing a ceramic powder suspension, wherein the ceramic powder suspension has a favorable dispersing ability and is stable.

The present invention also provides a method for processing a ceramic powder suspension, wherein the dissolution of barium ions in the slurry is reduced.

The present invention further provides a method for preparing a ceramic powder suspension, wherein the packing of the product formed by the ceramic powder suspension is denser.

In accordance to the present invention, a method for preparing a ceramic powder suspension comprises providing a dispersing agent having a following structure:

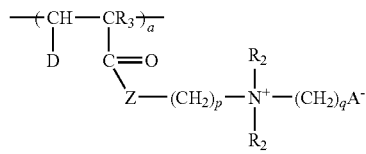

wherein D is H or $COOR_1$; $R_1$ is, for example, a hydrogen atom, or an alkyl group, a cyclic aliphatic group or an aryl group, having 1 to 10 carbon atoms, or a cationic salt group; $R_2$ is an alkyl group, a cyclic aliphatic or an aryl group, having 1 to 10 carbon atoms; $R_3$ is hydrogen or a methyl group; Z is an O atom or an NH group; A is a —COO group, a —$SO_3$ group or an acid form; a is an integer between 1 to 5000, while p and q are integers between 1 to 10. The dispersant is dissolved in a solvent. The ceramic powder is then added to the solvent with the dispersant to form a ceramic slurry.

The present invention further provides a method for forming a ceramic powder suspension, which comprises providing a dispersant. The dispersant is a poly(acrylamide/(α-N, N-dimethyl-N-acryloyloxyethyl) ammonium ethanate) (PAAM/DAAE) having the follow chemical structure:

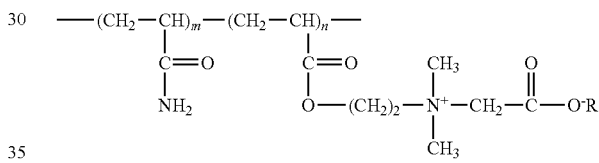

wherein R is $H^+$, $Na^+$, $NH_4^+$ or other cationic group; m is an integer from 10 to 5000; n is an integer from 10 to 3000. Thereafter, the dispersant is dissolved in a solvent. A ceramic powder is then added to the solvent with the dispersant to form a ceramic slurry.

The present invention further provides a method for preparing a ceramic powder suspension, wherein a dispersant is provided and the dispersant is a polyacrylamide/α-(N, N-dimethyl-N-(3-(β-carboxylate)acrylamino)propyl)ammonium ethanate) copolymer (PAAM/DAE) having the following chemical structure:

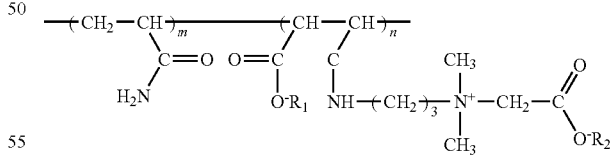

wherein $R_1$ and $R_2$ are $H^+$, $Na^+$, $NH_4^+$ or other cationic group; m is an integer from 10 to 5000; n is an integer from 10 to 3000. The dispersant is dissolved in a solvent. The ceramic powder is further added to the solvent with the dispersant to form the ceramic slurry.

In accordance to the present invention, using the poly(acrylamide/(α-N, N-dimethyl-N-acryloyloxyethyl) ammonium ethanate) (PAAM/DAAE) copolymer as a dispersant for the ceramic powder, the dispersion of the resulting slurry is good. The raw material formed from the slurry has a higher packing density and the ceramic sample can retain a compact shape without distortions after sintering. Further, using barium titanate ceramic powder as an example, the dissolution of barium ions is minimal after adding the PAAM/DAAE dispersant. Abnormal barium titanate growth is reduced during sintering and the ceramic sample is formed with a densified microstructure after sintering. Further, not only the dissolution of barium ions in the barium titanate slurry is reduced, the barium titanate powder also becomes less aggregated or agglomerated due to dispersing effect. The slurry is mostly in a suspended state rather than in a sediment state. In other words, the dispersant provides a desirable dispersing effect and stability to the barium titanate ceramic powder slurry.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
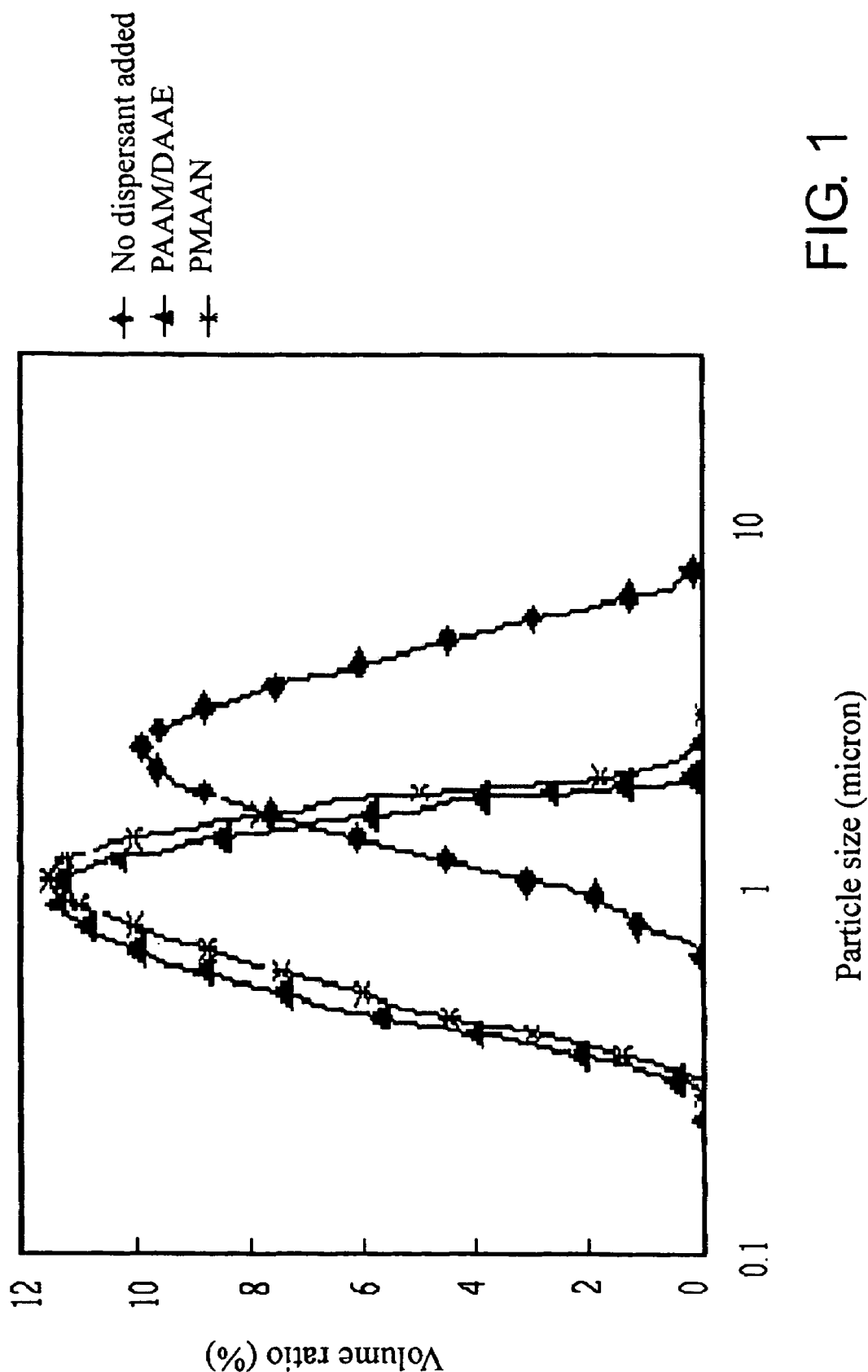
FIG. 1 is diagram illustrating the particle size distribution of barium titanate in the slurry using different dispersants.

The copolymer that serves as a dispersant in the present invention has the following chemical structure:

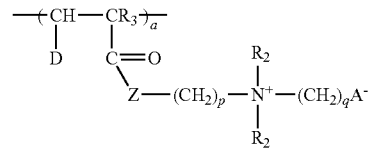

wherein D is H or $COOR_1$, wherein $R_1$ is, for example, a hydrogen atom, or an alkyl group, a cyclic aliphatic group or an aryl group, having 1 to 10 carbon atoms, or a cationic salt group; $R_2$ is an alkyl group, a cyclic aliphatic or an aryl group, having 1 to 10 carbon atoms; $R_3$ is a hydrogen atom or a methyl group; Z is an oxygen atom or an NH group; A is a —COO group, a —$SO_3$ group or an acid form; a is an integer between 1 to 5000, while p and q are integers between 1 to 10. The dispersant is dissolved in a solvent. The ceramic powder is then added to the solvent with the dispersant to form a ceramic slurry. The present invention can be better understood by way of the following description of using the derivatives of the copolymer dispersant of the present invention which are representative of the different aspects of the present invention which are not to be construed as limiting the scope of the invention.

First Embodiment

Before detailing the first embodiment of the present invention, the formation of the dispersant used in the present invention is discussed below.

Method of Forming the Copolymer as a Dispersant

The formation of an .alpha.-(N,N-dimethyl-(N-acryloyloxyethyl)) ammonium ethanate monomer is performed by dissolving 12.2 gram (0.08 mole) of dimethylamine ethyl acrylate and 8.1 gram (0.08 mole) of sodium chloroacetate in 60 gm of distilled water in a 250 ml beaker. After mixing and reacting for 24 hours at room temperature, the solution is placed in a vacuum condenser to remove a majority of the solvent. After washing with a large amount of acetone, the viscous material at the bottom of the beaker is collected as the end product. Thereafter, the upper layer acetone is removed. The viscous material in the beaker is dried inside an oven under a pressure of 1 torr and at room temperature for two days, and is subsequently collected as the DAAE monomer.

After obtaining the DAAE monomer, the polymerization of PAAM/DAAE is performed. In a four-necked reaction flask, 30 gm of acrylamide and 8.12 gm of the DAAE monomer are dissolved in 107.5 gm of distilled water. The solution is then placed under a nitrogen gas stream for 20 minutes. Thereafter, 70 gm of distilled water is placed in another reaction flask, followed by subjecting the distilled water to an nitrogen gas stream for 10 minutes. 5.406 gm of potassium persulfate and 0.856 gm of sodium thiosulfate are added to the distilled water, followed by subjecting the solution to an nitrogen gas stream for another 10 minutes. Thereafter, the solution is poured into the four-necked reaction flask. After mixing with a mixer for several minutes, the mixture is sealed and is allowed to settle for seven days to obtain a light yellow viscous material, which is the PAAM/DAAE derivative copolymer used as a dispersant of the present invention.

The effectiveness of the present invention can be better illustrated by way of the following examples, but are not to be construed as limiting the scope of the invention.

EXAMPLE 1

Two different dispersants are first dissolved in deionized water, followed by adding a barium titanate powder. In a corresponding experiment, no dispersant is used. The pHs of the three barium titanate solutions are adjusted to about 12 using a 1N sodium hydroxide solution. The dispersant added is about 2.5 wt % according to this embodiment of the present invention. The volumetric ratio of water to barium titanate powder is about 95:5. After ball-milling the sample for 24 hours, the distribution of the particle size is evaluated by a laser particle size analyzer. The particle size distribution of barium titanate in the slurry with different dispersants is illustrated in FIG. 1.

FIG. 1 illustrates the particle size distribution of barium titanate in the slurry with different dispersants. As shown in FIG. 1, using PAAM/DAAE as a dispersant, the average particle size ($d_{50}$) of the dispersion is about 0.9 micron. When PMAAN is used as a dispersant, the average particle size ($d_{50}$) of the dispersion is about 1.0 micron. These results strongly suggest that PAAM/DAAE provides dispersion to the barium titanate particles.

Since the powder particles have a smaller particle size, the particles can be more densely packed. In order to confirm the powder particles formed according to the present invention can be more densely packed, the dielectric constant and the dielectric loss of the ceramic sample are measured. The ceramic sample is formed after the barium titanate solution having PAAM/DAAE or PMAAN added is subjected to drying, grinding, pressing sintering, silver plating, and thermal treatment. The results are illustrated in FIGS. 2 and 3, discussed in following Example 2.

EXAMPLE 2

Figure 2:
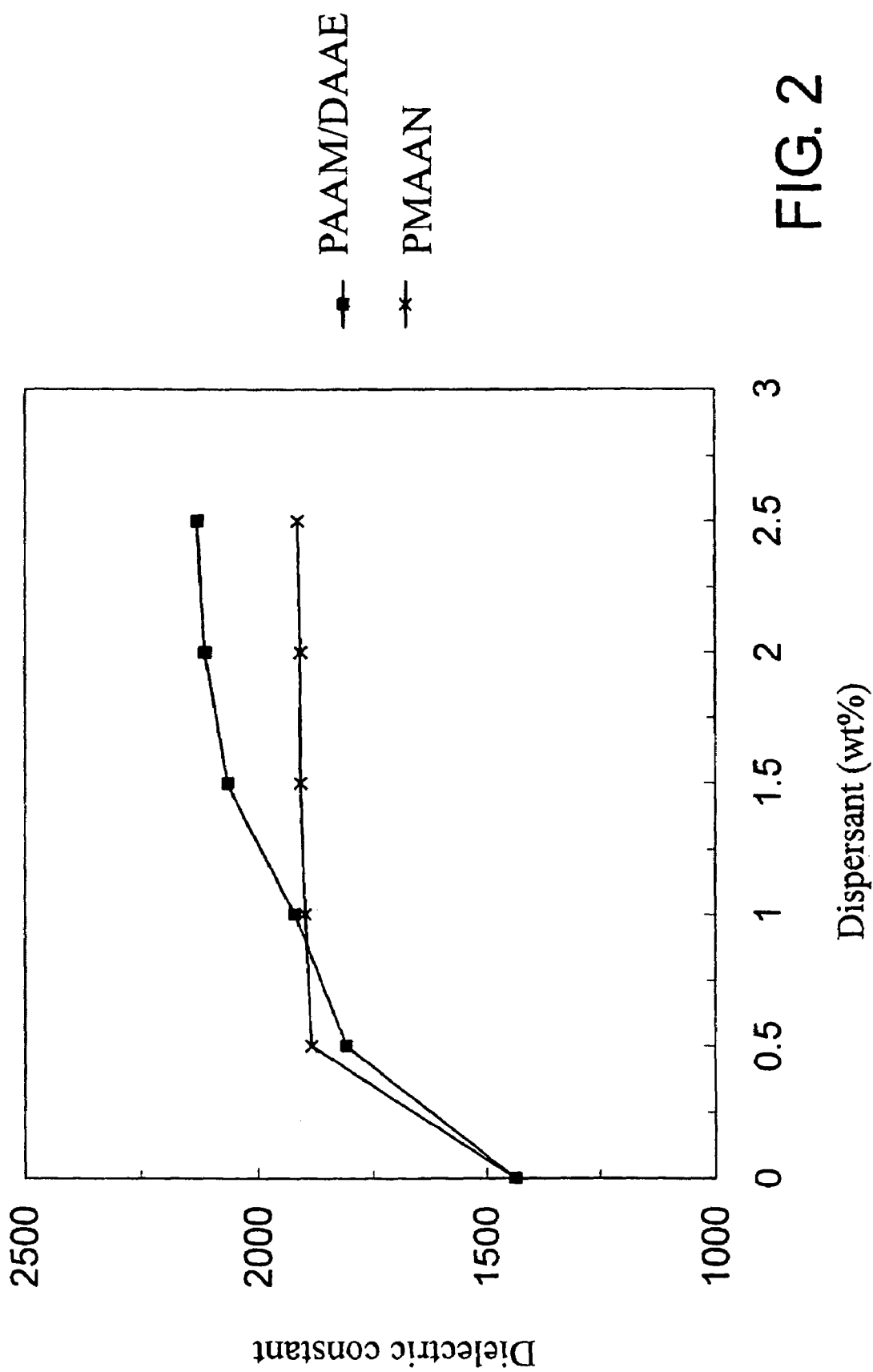
FIG. 2 is a diagram showing the relationship between the amount of dispersant added and dielectric constant of the barium titanate sample, for two different dispersants, under a sintering temperature of 1280° C.
Figure 3:
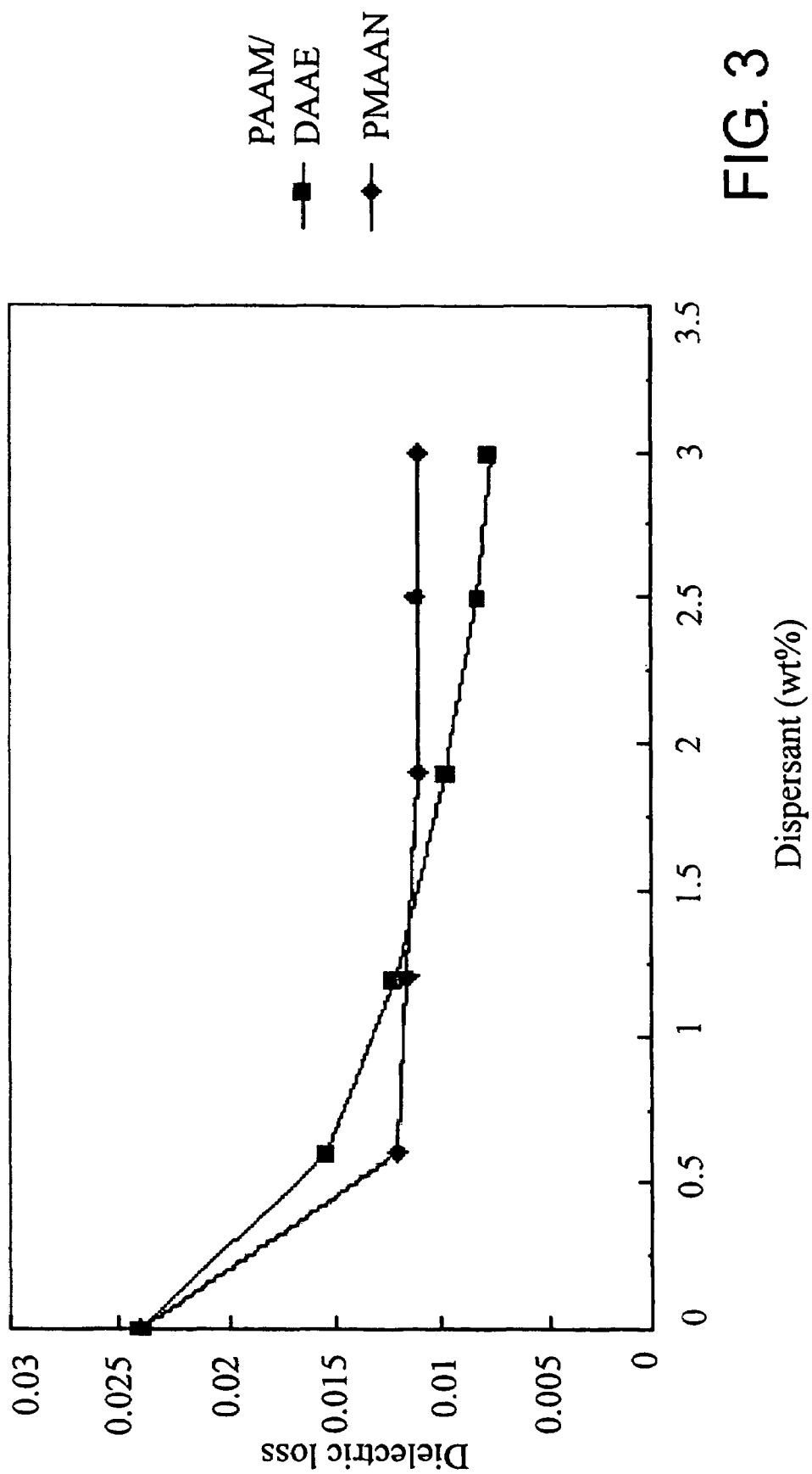
FIG. 3 is a diagram showing the relationship between the amount of the dispersant added and dielectric loss of the barium titanate sample, for two different dispersants, under a sintering temperature of 1280° C.

FIG. 2 is a diagram illustrating the relationship between the amount of dispersant added and the dielectric constant of the barium titanate sample, under a sintering temperature of 1280° Celsius., for two different dispersants. As shown in FIG. 2, under the sintering temperature of 1280° Celsius., the dielectric constant of the barium titanate sample with PAAM/DAAE added as a dispersant is higher than that with PMAAN added as a dispersant. Therefore, adding PAAM/DAAE as a dispersant provides a better dispersion, and the particles can be more densely packed to increase the dielectric constant of the sample after sintering. FIG. 3 is a diagram illustrating the relationship between the amount of the dispersant added and the dielectric loss of the barium titanate sample, under a sintering temperature of 1280° Celsius., for two different dispersants. As shown in FIG. 3, as the amount of dispersant increases, the dielectric loss of the sample having PAAM/DAAE as a dispersant decreases.

EXAMPLE 3

Figure 4:
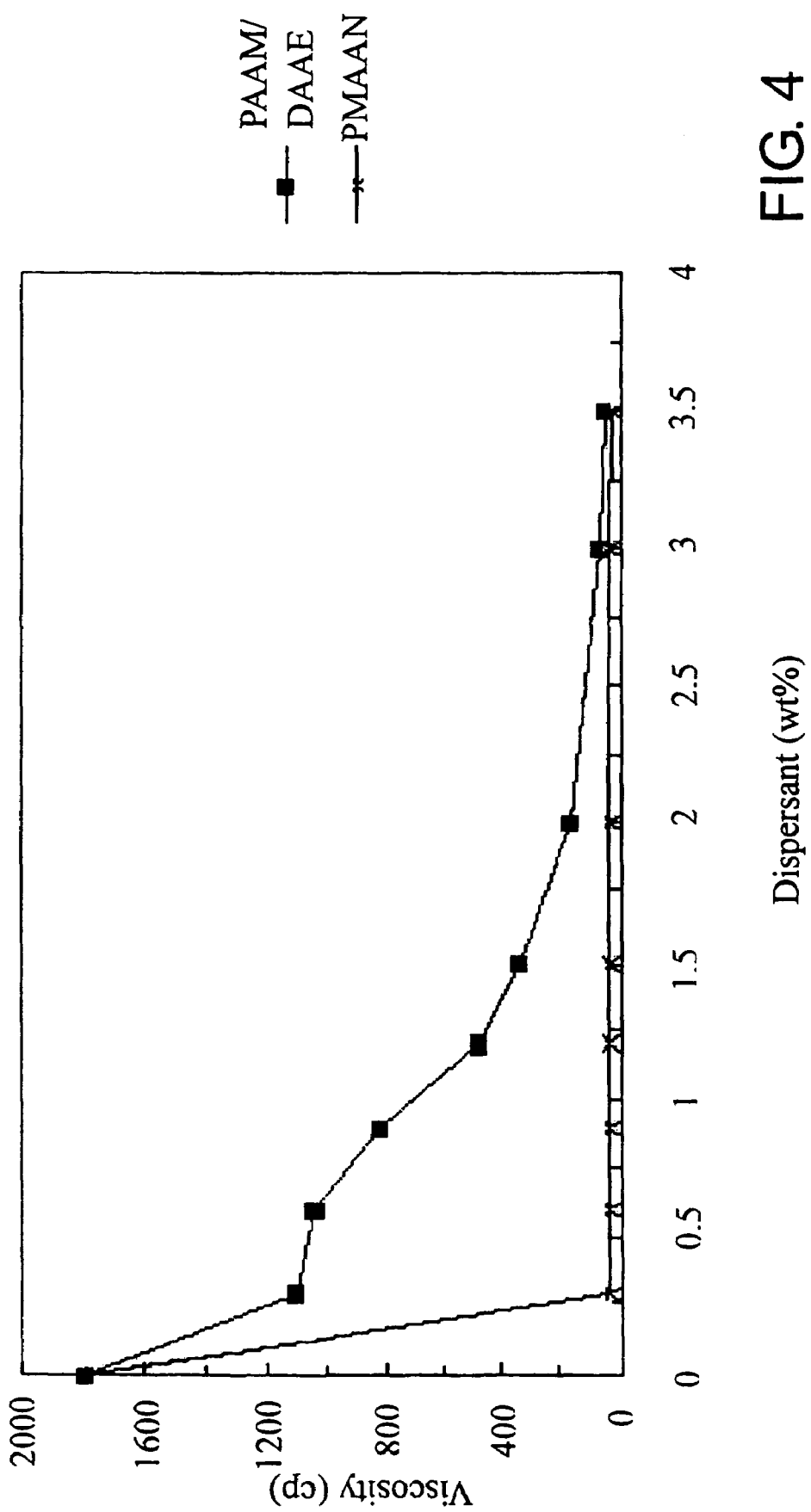
FIG. 4 is a diagram showing the relationship between viscosity of the barium titanate slurry and the amount of the dispersant added, for two different dispersants.

In this example, barium titanate powder and deionized water are provided at a weight ratio of about 3:2, whereas the amount of the dispersant in the barium titanate slurry varies. The pH value of the slurry is adjusted to about 12. After the aforementioned slurry is ball-milled for 24 hours, the viscosity of the slurry having different amounts of the dispsersant added is measured using a Brookfield DV-II viscometer, and the result is illustrated in FIG. 4. As shown in FIG. 4, when the dispersant is about 3.0 wt %, the viscosity is decreased to about 30 cps, which indicates that using PAAM/DAAE as a dispersant can reduce the viscosity of the barium titanate slurry and provide better dispersion.

EXAMPLE 4

To confirm that the dispersion of the suspension prepared according to the present invention is good, an experiment is conducted wherein the change of the sediment volume is measured. The sediment volume refers to the space distributed over by the particles in the entire suspension. Barium titanate and deionized water are provided at a volumetric ratio of 5:95, whereas the amount of the dispersant in the slurry varies. The pH value of the slurry is adjusted to about 12. After being ball-milled for 24 hours, the barium titanate slurry is poured into a graduated cylinder and is allowed to settle in a sealed condition. Changes in the sedimentation volume are observed, and the results are shown in FIGS. 5 and 6.

Figure 5:
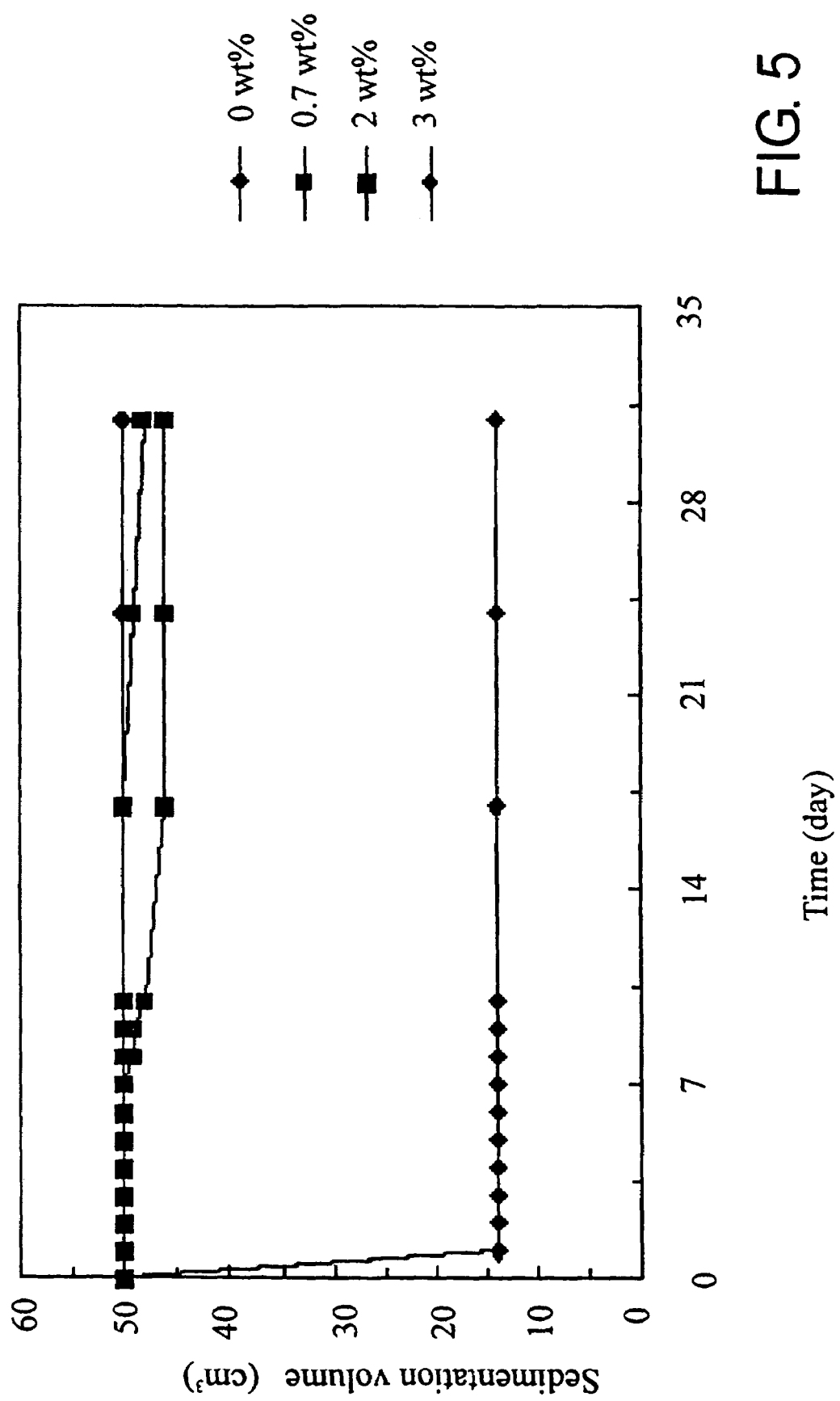
FIG. 5 is a diagram showing the relationship between the sedimentation time and the sedimentation volume of the barium titanate slurry at different weight percent of PAAM/DAAE.
Figure 6:
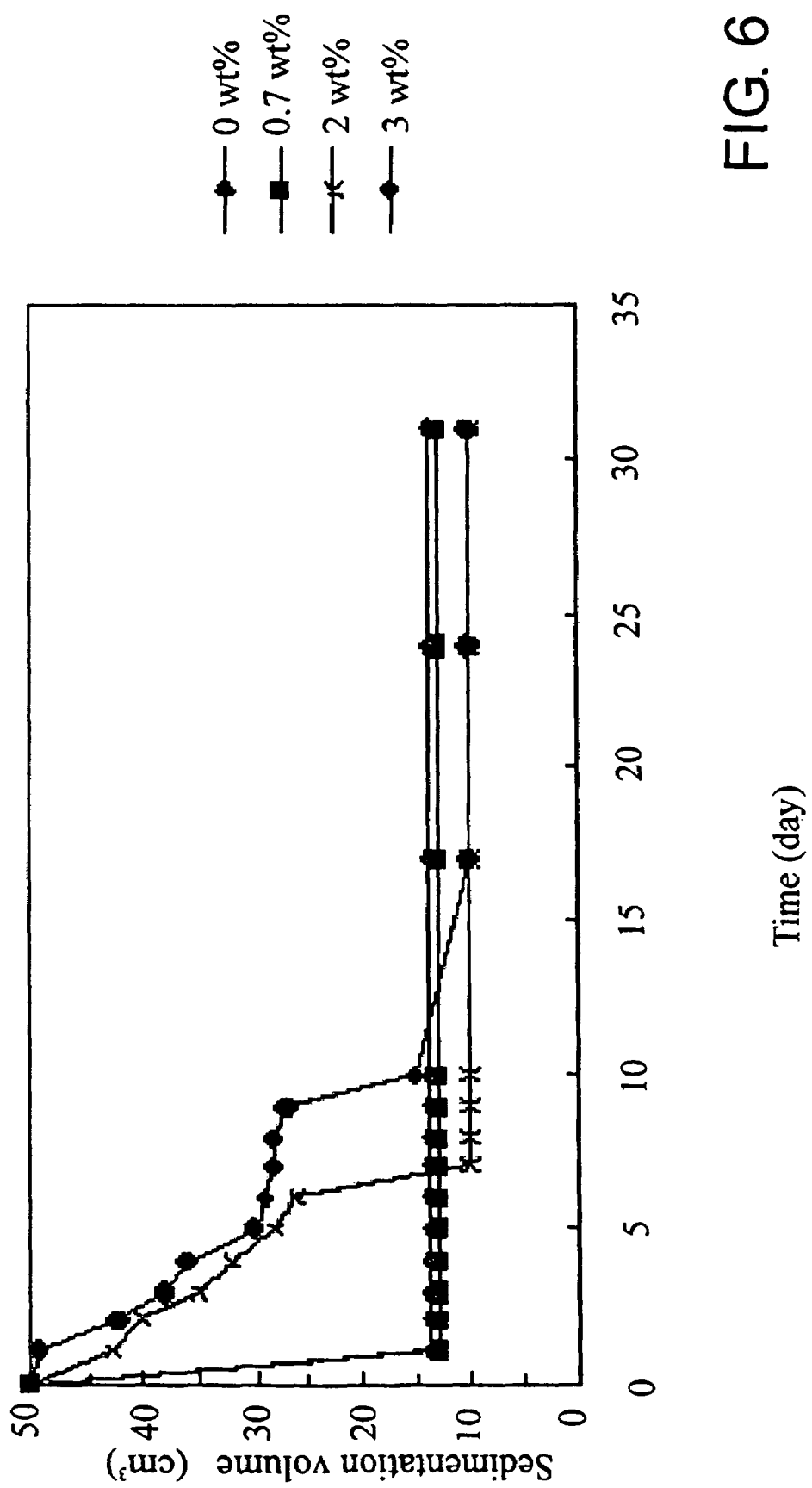
FIG. 6 is a diagram showing the relationship between the sedimentation time and the sedimentation volume of the barium titanate slurry at different weight percent of PMAAN.

FIG. 5 is a diagram illustrating the relationship between the sedimentation time of the barium titanate slurry and the sedimentation volume at different weight percents of PAAM/DAAE. FIG. 6 is a diagram illustrating the relationship between the sedimentation time of the barium titanate slurry and the sedimentation volume at different weight percents of PMAAN. As shown in FIG. 5, when no dispersant is added to the barium titanate slurry, particles tend to agglomerate and are not well dispersed. Consequently, the sedimentation rate is fast and a majority of the particles are settled within 5 hours. Two layers of water and sediment are easily observed in the graduated cylinder. When the amount of PAAM/DAAE is greater than 0.7%, the dispersion is good. A majority of the barium titanate particles is suspended in the graduated cylinder and very little sediment is present. The suspension in the graduated cylinder appears turbid and no distinguishable layers are observed. Referring to FIG. 6, when PMAAN is added to the barium titanate slurry, sedimentation tends to occur due to the agglomeration of particles. Particles are completely settled to the bottom within about 20 days. In summary, adding PAAM/DAAE to the barium titanate slurry as a dispersant definitely improve the dispersion and stability.

Further, using the conventional PMAAN as a dispersant for the barium titanate slurry, abnormal grain growth often occurs during the high temperature sintering process due to the dissolution of barium ions. To confirm the present invention can overcome such deficiency, the following experiment is conducted.

EXAMPLE 5

Figure 7:
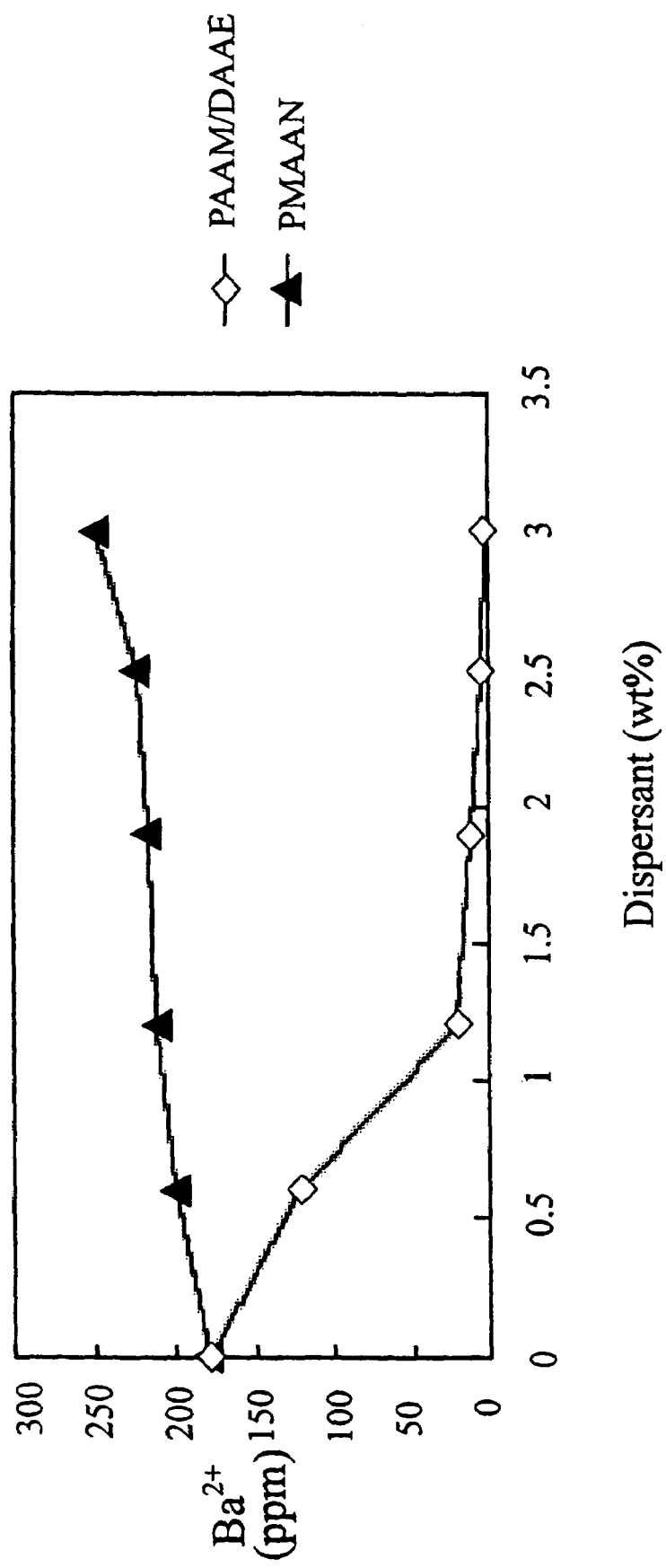
FIG. 7 is a diagram showing the relationship between different amounts of the dispersant added and the amount of the barium ions dissolved.

Barium titanate and deionized water are provided at a volumetric ratio of 5:95, whereas the amount of the dispersant in the slurry varies. The pH value of the slurry is adjusted to about 12. After being ball-milled for 24 hours, the slurry is centrifuged at 10000 rpm for 20 minutes. The supernatant is collected and is measured with an inductive coupling plasma atomic emission spectrum analyzer. The concentration of ions is determined based on the intensity of the spectrum, and the result is shown in FIG. 7. FIG. 7 is a diagram showing the relationship between the weight percents of the dispersant added and the amount of the dissolved barium ions. As shown in FIG. 7, when PMAAN is used as a dispersant, the amount of barium ions dissolved increases, indicating that the PMAAN dispersant increases the dissolution of the barium ions, whereas using PAAM/DAAE as a dispersant, the amount of dissolved barium ions is minimal. Accordingly, adding PAAM/DAAE to the barium titanate slurry, the dissolution of barium ions is less than that when PMAAN is added to the slurry.

Second Embodiment

Before detailing the second embodiment of the present invention, the formation of the dispersant used in the present invention is discussed below.

Method of Forming the Copolymer as a Dispersant

The formation of .beta.-carboxylate-N-(3-dimethylaminopropyl) acrylamide (CDPA) comprises dissolving 19.6 gm maleic anhydride in 80 gm of acetone, further by drop adding 20.4 gm of dimethyl-1,3-propylene diamine. Mixing is continued for two hours after adding dimethyl-1,3-propylene diamine to ensure the reaction is completed. After being vacuum filtered and washing with acetone, the filtered solid powder is dried in a non-heated vacuum oven for two days.

After obtaining the CDPA, the formation of the monomer DAE is performed, wherein 20 gm of CDPA is dissolved in 60 gm of distilled water. The solution is neutralized to a pH of about 9-10, followed by adding 11.8 gm of sodium chloroacetate. Thereafter, the solution is mixed at room temperature for about 6 hours. A majority of the solvent is removed in a vacuum condenser, followed by washing with a large amount acetone. After the acetone is removed, the sample is dried under vacuum in an oven at 1 torr and room temperature for two days to collect the DAE monomer.

After obtaining the DAE monomer, the polymerization of the poly (acrylamide/.alpha.-(N,N-dimethyl-N-(3-(.beta.-carboxylate) acrylamino) propyl) ammonium ethanate) PAAM/DAE is conducted by first preparing two solutions. Solution 1 is prepared by dissolving 30 gm of acrylamide and 12.8 gm of DAE monomer in 136 gm of distilled water, followed by exposing the solution to a nitrogen gas stream for 20 minutes. Solution 2 is prepared by exposing 35 gm of distilled water to a nitrogen gas stream for 10 minutes, followed by adding 2.14 gm of potassium persulfate and 0.428 gm of sodium thiosulfate to the distilled water and exposing the solution to a nitrogen gas stream for another 10 minutes. Thereafter, Solution 2 is added to Solution 1. After mixing for several minutes, the mixture is sealed and is allowed to settle, and PAAM/DAE is collected after three days.

The effectiveness of the present invention can be better illustrated by way of the following examples, in which PAAM/DAE is actually applied. These examples are representative of an aspect of the present invention which are not to be construed as limiting the scope of the invention.

EXAMPLE 1

Two different types of dispersant and one type of barium titanate powder are used to prepare two different barium titanate powder suspensions. The two types of dispersant used include PAAM/DAE and PMAAN (Darvan C).

The two different dispersants are first dissolved in deionized water, followed by adding the barium titanate powder. The pH values of the barium titanate suspensions are adjusted to 12 using a 1N sodium hydroxide solution. The weight percents of dispersant to barium titanate powder used in preparing the suspensions of the present invention are 0.5, 0.8, 1, 1.2, 1.5, 2, and the weight percent of the barium titanate powder in the slurry is about 20. The samples are then ball-milled for 24 hours, and the particle size distribution is determined using a laser particle size analyzer. The particle size ($d_{10}$) of the three different barium titanate suspensions as shown in FIG. 8.

Figure 8:
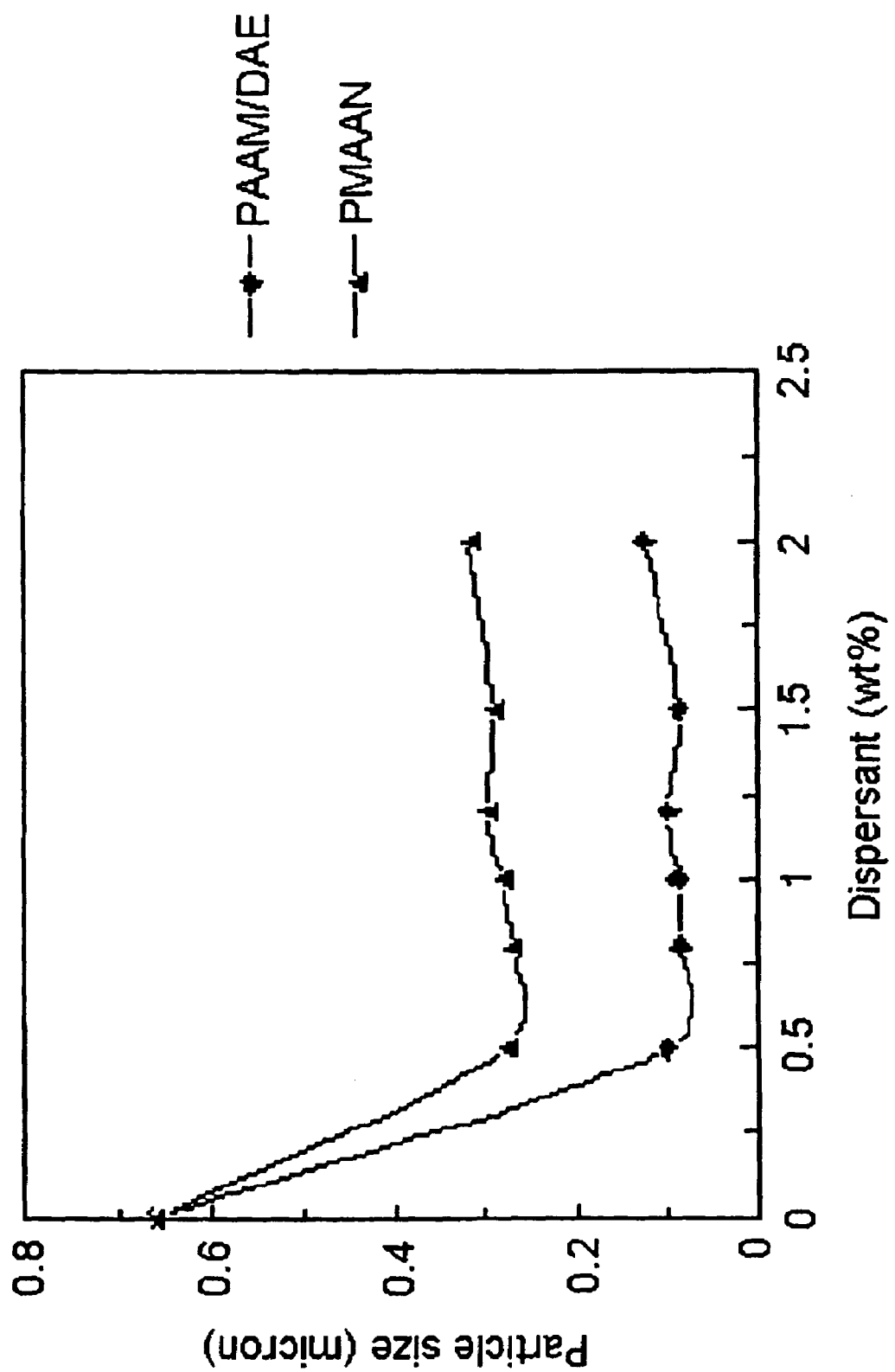
FIG. 8 is a diagram showing the particle size ($d_{10}$) of the barium titanate in the slurry with different amounts of the dispersant.

FIG. 8 is a diagram illustrating the particle size ($d_{10}$) of the barium titanate suspensions at different weight percents of the dispersants. As shown in FIG. 8, when the dispersant is 0.8 weight %, the particle size is about 0.085 microns when PAAM/DAE is used as the dispersant, whereas the particle size is about 0.272 microns when PMAAN is used as the dispersant. These results indicate that PAAM/DAE provides a better dispersion to the smaller size barium titanate particles. Since the smaller size powder particles can fill the space between the larger particles, the packing density is higher.

EXAMPLE 2

The dielectric constant and the dielectric loss of the ceramic sample are measured, wherein the ceramic sample is formed after the barium titanate solutions having PAAM/DAE or PMAAN added is subjected to drying, grinding, pressing, sintering, silver plating and thermal treatment. The results are summarized in Table 1 and Table 2

TABLE 1

|  |  | Sintering Temperature | |
| --- | --- | --- | --- |
|  |  | 1200° C. | 1300° C. |
| Dielectric | PAAM/DAE | 2180 | 2250 |
| Constant | PMAAN | 1920 | 2070 |

As shown in Table 1, under different sintering temperatures, the dielectric constant of the ceramic sample having PAAM/DAE added as a dispersant is higher than that having PMAAN added. These results suggest that PAAM/DAE provides better dispersion, a higher packing density and a higher, sintered dielectric constant.

TABLE 2

|  |  | Sintering Temperature | |
| --- | --- | --- | --- |
|  |  | 1200° C. | 1300° C. |
| Dielectric | PAAM/DAE | 0.021 | 0.025 |
| Loss | PMAAN | 0.026 | 0.029 |

As shown in Table 2, under different sintering temperatures, adding PAAM/DAE as a dispersant results in a lower sintered dielectric loss.

EXAMPLE 3

Figure 9:
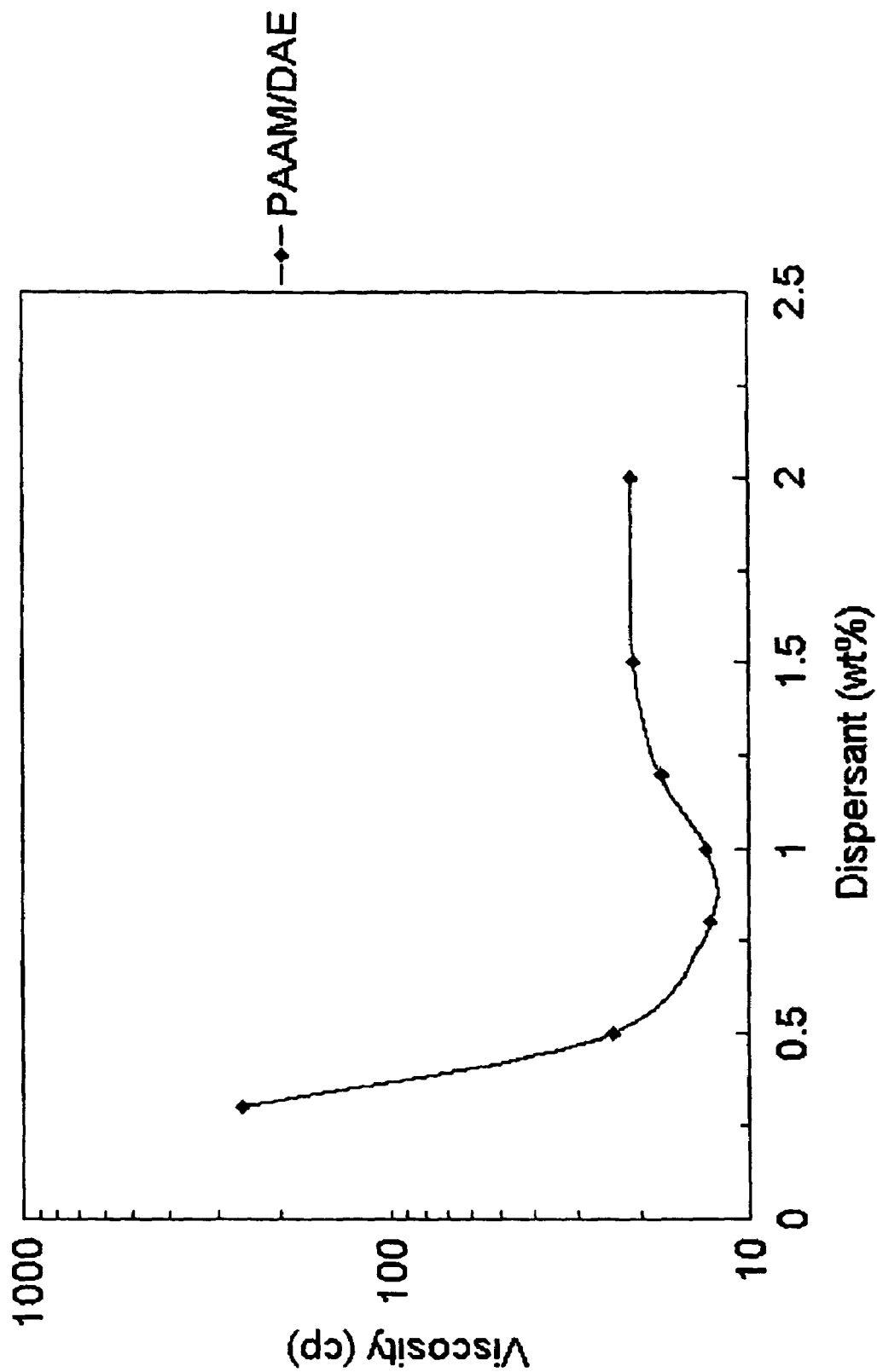
FIG. 9 is a diagram showing the relationship between the viscosity of the barium titanate slurry and the different amounts of PAAM/DAE added.

Barium titanate and deionized water are provided at a weight ratio of 3:2, whereas the amount of the dispersant in the slurry varies. The weight percents of dispersant to barium titanate powder are 0.3, 0.5, 0.8, 1, 1.2, 1.5, and 2, respectively. The pH value of the slurry after mixing is adjusted to about 12. Thereafter, the slurry is ball-milled for 24 hours. The viscosity of the slurry having different amounts of PAAM/DAE added is measured using a Brookfield DV-II viscometer, and the results are shown in FIG. 9. As shown in FIG. 9, the viscosity of the slurry is lowered to about 14.4 cps when the dispersant is 0.8% (weight ratio of dispersant to powder). The result suggests that adding PAAM/DAE as a dispersant lowers the viscosity of the barium titanate slurry to have better dispersion.

EXAMPLE 4

To confirm the suspensions prepared according the present invention provide a more desirable dispersing effect, an experiment is conducted by preparing barium titanate powder in deionized water at a weight ratio of about 1:4. The weight percents of the dispersant to the barium titanate powder are 0, 0.5, 1, and 1.5, respectively. The pH of the slurry after mixing is adjusted to about 12. After ball-milling the slurry for 24 hours; the barium titanate slurry is poured into a graduated cylinder, sealed and allowed to settle. Changes in the sedimentation height are observed, and the results are summarized in FIG. 10 and FIG. 11.

Figure 10:
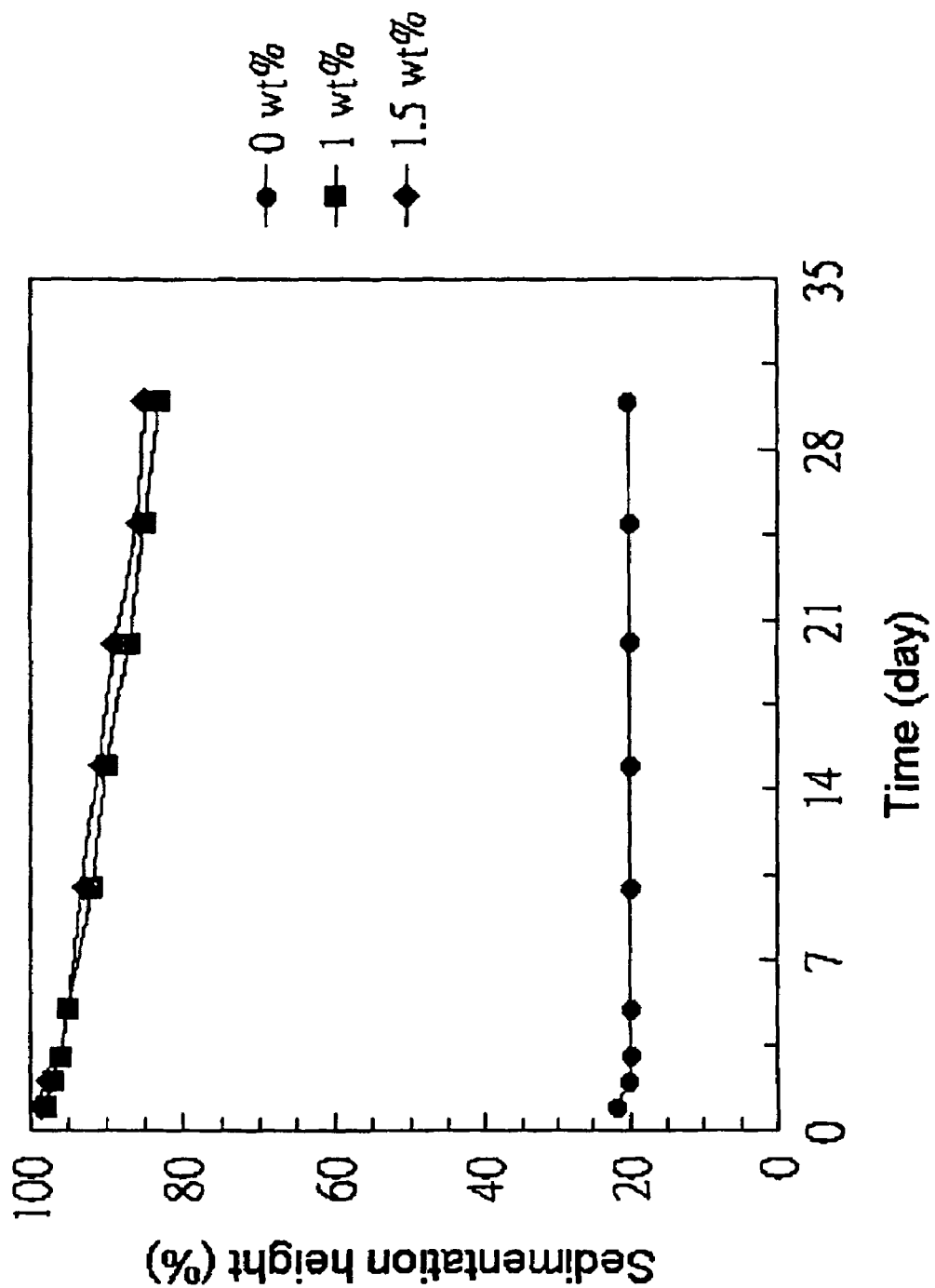
FIG. 10 is a diagram showing the relationship between the sedimentation time and the sedimentation height of the barium titanate slurry with different amounts of PAAM/DAE added.
Figure 11:
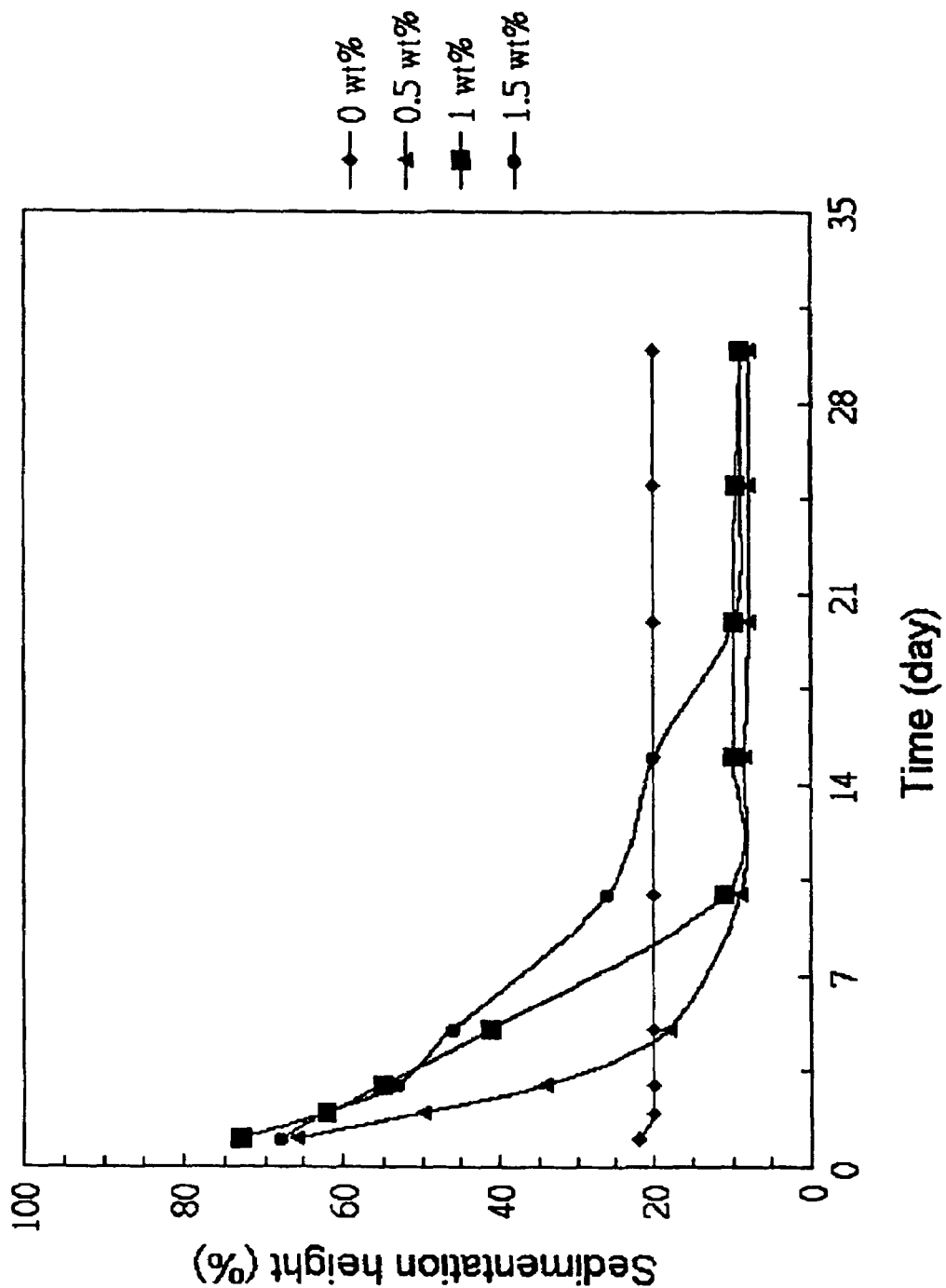
FIG. 11 is a diagram showing the relationship between the sedimentation time and the sedimentation height of the barium titanate slurry with different amounts of PMAAN.

FIG. 10 is a diagram illustrating the relationship between the sedimentation time and the sedimentation height at different weight percents of PAAM/DAE. FIG. 11 is a diagram illustrating the relationship between the sedimentation time and the sedimentation height at different weight percents of PMAAN. The sediment height refers to the percent of the total height of the dispersion distributed over by the particles. As shown in FIG. 10, when no dispersant is added to the barium titanate slurry, particles would agglomerate and are not dispersed well. Consequently, the sedimentation rate is fast. Further, a majority of the particles are settled within 5 hours. The two layers of water and sediment can be distinguishably observed in the graduated cylinder. When the PAAM/DAE additive is greater than 1%, dispersion is favorable, wherein the majority of the barium titanate particles remain suspended in the graduated cylinder and very little sediment is observed. The suspension in the graduated cylinder is turbid and no distinguishable layers are observed. Referring to FIG. 11, adding PMAAN (Darvan C) to the barium titanate slurry, sediment tends to occur due to the agglomeration of particles. Accordingly, adding PAAM/DAE to the barium titanate slurry as a dispersant improves dispersion and stability.

EXAMPLE 5

Further, using the conventional PMAAN as a dispersant for the barium titanate slurry, the dissolution of barium ions is high leading to a low sintered packing density. To confirm the present invention can overcome such deficiency, the following experiment is conducted.

Figure 12:
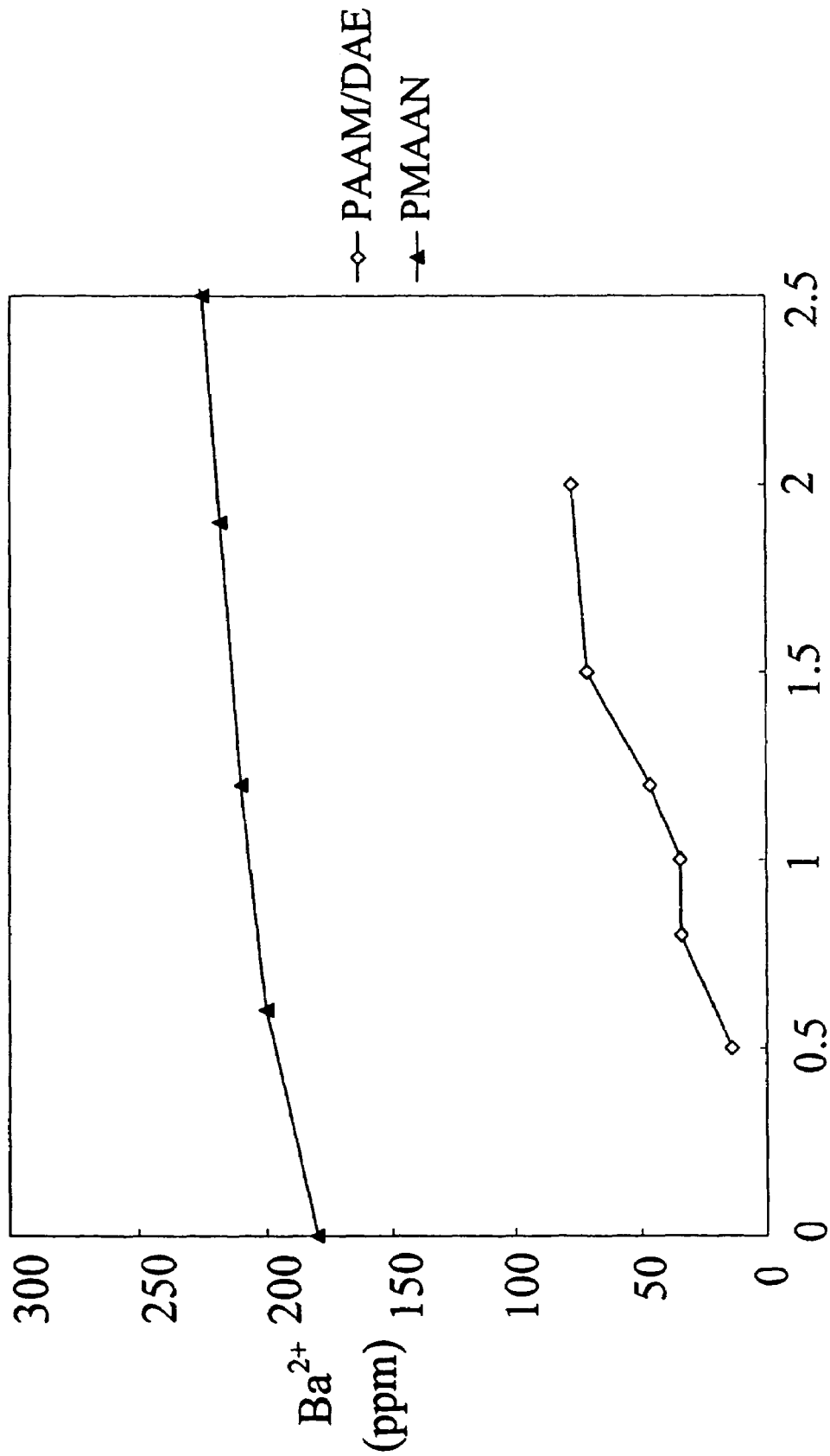
FIG. 12 is a diagram showing the amounts of the barium ions dissolved at different amounts of the dispersant.

Barium titanate and deionized water are provided at a weight ratio of 1:4, whereas the amount of the dispersant in the slurry varies. The weight percents of the dispersant to the barium titanate powder are 0, 0.5, 1, and 1.5, respectively. The pH of the slurry after mixing is then adjusted to about 12. After ball milling the sample for 24 hours, the sample is centrifuged at 10000 rpm for 20 minutes. The supernatant is collected and is measured with an inductive coupling plasma atomic emission spectrum analyzer. The result is shown in FIG. 12. FIG. 12 is a diagram showing the relationship between the amount of dispersant added and the amount of barium ions dissolved. As shown in FIG. 12, when PMAAN is used as a dispersant, the amount of barium ions dissolved increases, indicating that PMAAN increases the dissolution of the barium ions, whereas using PAAM/DAE as a dispersant, the amount of the dissolved barium ions is minimal. Accordingly, adding PAAM/DAE to the barium titanate slurry, the dissolution of the barium ions is less than that when PMAAN is added to the slurry.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A method for processing a ceramic powder suspension, comprising:
providing a dispersant which can reduce the release of barium ions in a barium titanate slurry, wherein the dispersant has a following structure:

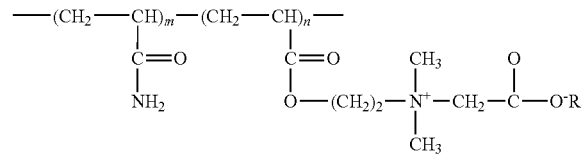

wherein R is a H+ ion, an Na+ ion, an NH4+ ion or other cationic group;
m is an integer from 10 to 5000; and
n is an integer from 10 to 3000;
dissolving the dispersant in a solvent; and
adding a ceramic powder to form a slurry.

2. The method of claim 1, wherein the solvent comprises deionized water.

3. The method of claim 1, wherein the ceramic powder comprises a barium titanate powder.

4. The method of claim 3, wherein an amount of the dispersant added is about 0.5 wt% to about 3.5wt %, and wherein subsequent to adding the ceramic powder into the solvent further comprises adding a sodium hydroxide solution to adjust a pH value of the slurry, and wherein a concentration of said sodium hydroxide solution is about 1N to adjust the DH value to about 12.

* * * * *